United States Patent [19]

Briscoe

[11] 3,855,958

[45] Dec. 24, 1974

[54] SPEEDOMETER ATTACHMENT WHICH PERMITS A DIRECT READING IN KILOMETERS PER HOUR FROM A MILES PER HOUR SCALE AND CONVERSELY

[76] Inventor: David Briscoe, Willemer Strasse 13, Frankfurt/Main, Germany

[22] Filed: Mar. 1, 1972

[21] Appl. No.: 230,560

[30] Foreign Application Priority Data
Mar. 4, 1971 Germany.................... 7108191[U]

[52] U.S. Cl. .................. 116/116, 73/495, 116/135
[51] Int. Cl. ............................................ G01p 1/06
[58] Field of Search ....... 116/57, 74, 116, 129, 135; 73/2, 495; 40/77.4, 142 R, 140; 235/103.5

[56] References Cited
UNITED STATES PATENTS

| | | | |
|---|---|---|---|
| 2,075,764 | 3/1937 | Marten.................. | 40/142 R X |
| 2,175,129 | 10/1939 | Rolfson.................. | 116/129 |
| 2,588,183 | 3/1952 | Vigon..................... | 40/140 |
| 2,679,229 | 5/1954 | Roderman............. | 116/129 |
| 2,810,362 | 10/1957 | Zindheim................ | 116/116 |
| 3,173,220 | 3/1965 | Zachenmeier......... | 40/140 |
| 3,446,178 | 5/1969 | St Clair et al......... | 116/116 |
| 3,574,964 | 4/1971 | Ownbey.................. | 40/140 |

FOREIGN PATENTS OR APPLICATIONS 840,623   6/1952   Germany ........................... 116/116

Primary Examiner—Louis J. Capozi
Attorney, Agent, or Firm—Larson, Taylor & Hinds

[57] ABSTRACT

A simple and easy to mount outer attachment to automobile speedometers the scale of which reads in another speed unit than is used in the country the car is driven. The attachment consists of a strip that can be affixed on the scale glass parallel to the scale and by means of one or more rabbets or slots holds letters or numbers made with extensions corresponding to the slots. The letters and numbers can be placed along the strip in such order and figuration that they represent the desired secondary scale and then are fixed on the strip.

10 Claims, 3 Drawing Figures

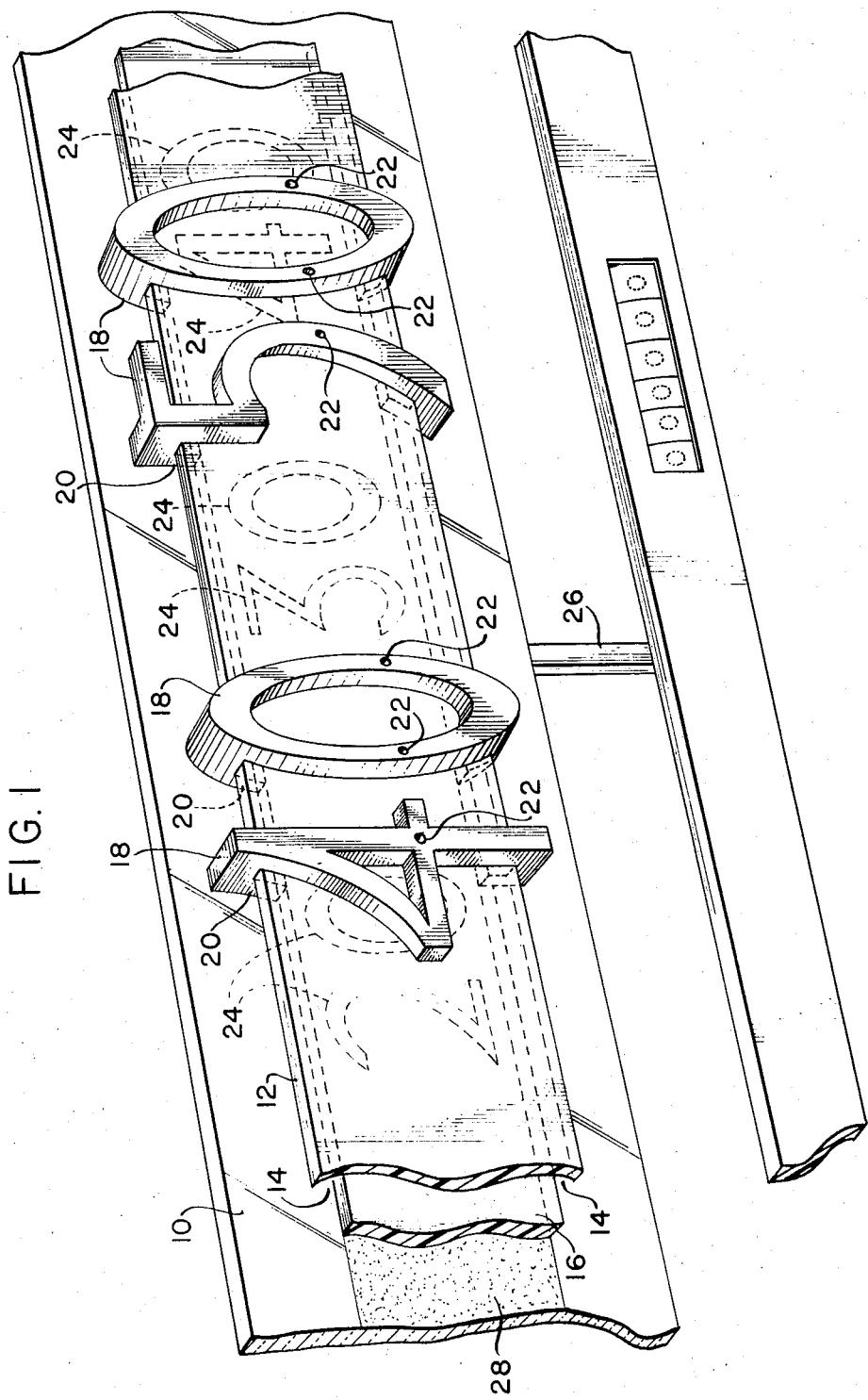

SPEEDOMETER ATTACHMENT WHICH PERMITS A DIRECT READING IN KILOMETERS PER HOUR FROM A MILES PER HOUR SCALE AND CONVERSELY

BACKGROUND OF THE INVENTION

This invention relates to the fact that the operation of a vehicle in areas of the world where vehicle speed is regulated in metric units of kilometers per hour, subjects the operator to the constant burden of calculating without instrumental aid the arithmetic value of kilometers using this basic scale in miles and conversely, sometimes in unfamiliar traffic environments. The results are sometimes nervousness, traffic violations, and distraction because of inadequate instruments.

SUMMARY OF THE INVENTION

Thus, it is a purpose of the present invention to permit the operator of a vehicle to read the unit of speed control of other countries directly from his basic indicator built into the vehicle by its manufacturer and to be mounted regardless of its size, shape, and form, the mounting of which consumes a negligible amount of time so that it can be carried out at a border crossing point or a filling station in route thereto.

This purpose of the present invention is achieved by means of a strip with one or more rabbets, grooves or slots positionable on the vehicles' speedometer scale, the rabbets or grooves serving as guide slots for positioning numbers on the scale in such a way that they correspond with the numerical values required to be indicated as speed. The strip can be measured with enough excess length so as to be useable with the longest speedometer scale which may come into question. In the case of shorter scales it can be correspondingly shortened. In the case of scales varying slightly from a straight line, i.e., with a slight curvature, the strip can be bent to correspond. In the case of scales with the form of a complete circle or of a square, material can be used to create a sheet of concentric or parallel rings or squares of different size which can easily be separated allowing an adequate choice of the proper ring or square. Any part of the circumference of the ring or border of the square chosen can be cut out if desired or left remaining as a non-functional continuation for aesthetic reasons. The material chosen can have luminous character so that if the instrument lighting is turned off only the attachment is visible.

The strip can be provided with grooves or slots, and in this case, directly attached to the main speedometer scale. It can also be attached by means of a band which has adhesive substance on both sides of it, if the band is chosen with a certain thickness and at the same time is kept smaller in width than the strip, or if an additional strip which is smaller in width is mounted under or between the former strip and the speedometer scale glass.

This results in a space along the whole length of the strip on the upper and lower edges.

The letters, numbers or the like which are to be fastened to the strip can have properly positioned extensions that interlock with the upper and lower edges of the strip. In this case the grooves for mounting the letters or numbers do not result from contours incorporated in the form of the cross section of the strip, but instead comes about as a result of the described method of mounting the attachment on the main speedometer scale glass by the way of a small strip under a wider strip, in other words between this strip and the main speedometer glass.

When the extensions of the letters, numbers, etc., have been inserted in the grooves, the numbers, letters, etc., can be brought into position on the scale by sliding them in the required direction. An unintentional shifting of the numbers or letters out of position can be prevented by boring small diameter holes through their cross-sections exposing the surface of the strip below. If after the letters or numbers are brought into position the hole is filled with glue or adhesive material then the letters or numbers are held reliably in the required positon. This eliminates dependence on friction or tightness of fit. The strip can be mounted on the main speedometer glass or scale using this same principle.

BRIEF DESCRIPTION OF THE DRAWINGS

FIG. 1 is a perspective sectional view of a preferred embodiment of the invention mounted on the scale glass of a vehicle speedometer.

DETAILED DESCRIPTION OF THE PREFERRED EMBODIMENTS

Figure 2A:
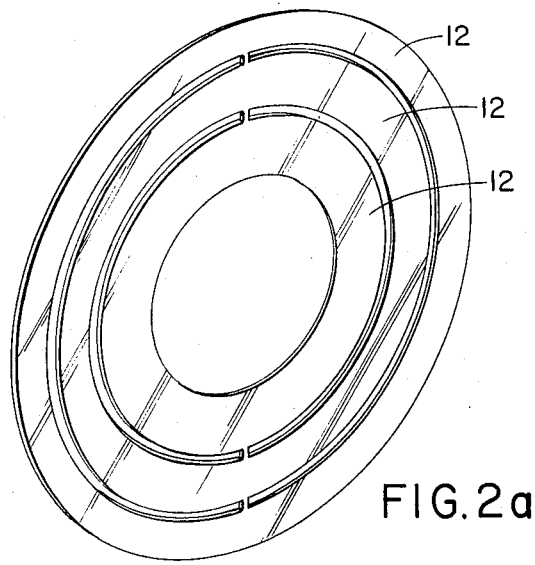
FIG. 2a is a perspective view of a plurality of circular strips formed from a single piece of material.

In FIG. 1, a basic vehicle speedometer scale 10 is illustrated which has a scale of numbers 24 representing the numerical values of the speed units of the basic speedometer scale 10. Attached thereto by means of adhesive substance 28, and parallel to the scale of numbers 24 is a laminate of inner strip 16 and outer strip 12. Strip 12 is wider than strip 16, for example 5mm for the former and 2mm for the latter, and both strips are of a sufficient thickness, for example 1mm, such that slots or grooves 14 are formed along the whole length of the scale between the basic speedometer scale 10 and the strips 12 and 16.

Attached to strip 12 are numbers 18 representing the numerical values of the new speed units to be directly read. The numbers 18 are attached to strip 12 by extensions which interlock with slots 14, but allow the numbers 18 to be moved laterally along strip 12. The numbers 18 are shown with aperatures 22 extending frome the front face to the rear face of the numbers 18 and into which an adhesive substance may be placed to secure the numbers from unintentional movement.

The laminate formed by strips 12 and 16 can be shown, or formed by means of one solid strip with the same contours as shown incorporated in it. The laminate formed by strips 12 and 16 can be either sttached directly by applying adhesive substance 28 on the inner surface of strip 16 or by means of a band with adhesive substance on both sides of it. If a band is chosen with the required thickness, then it can completely replace the strip 16 giving another possibility.

Whatever possibility is chosen, the slots or grooves 14 should have sufficient depth, lets say, e.g., 1mm, so that the upper and lower extensions 20 of the letters or numbers 18 will interlock with the grooves and permit the numbers, letters, etc., to be moved laterally along strip 12.

Once the strips 12 and 16, or their equivalent, are secured to the basic speedometer scale 10 the numbers or letters 18 are brought into positions on the scale by sliding them in the required direction. Herewith a scale is formed that it different from the units of the basic scale so as to meet with the requirements of the country where the vehicle is operated.

An unintentional shifting of the numbers or letters 18 out of position can be prevented by boring a small diameter hole 22 through their crosssections exposing the surface of the strip 12 below. If after the letters or numbers 18 are brought into positon the hole is filled with glue or adhesive substance, then the letters or numbers 18 are held securely in the required positions. The same process can be used to mount the strips 12 and 16 or their equivalent.

Figure 2B:
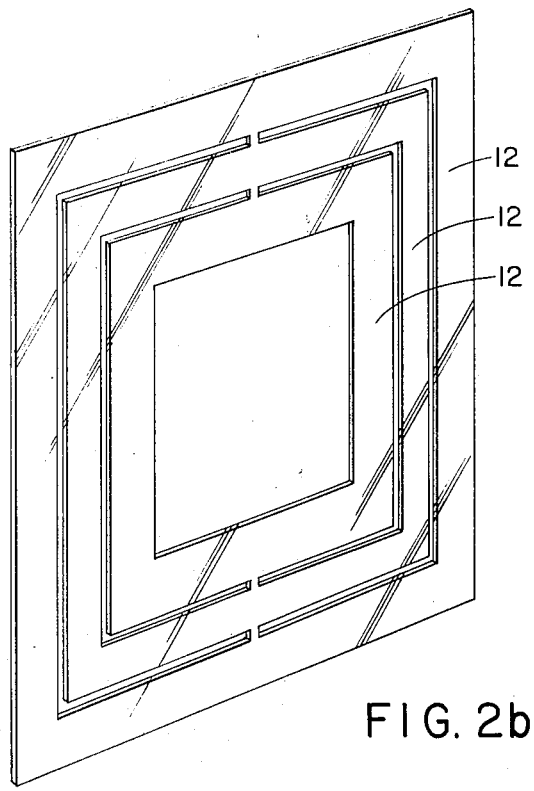
FIG. 2b is a perspective view of a plurality of square strips formed from a single piece of material.

In the case of a scale 10 varying slightly from a straight line, e.g., with a slight curvature, the strips 12 and 16 or their equivalent can be bent to a corresponding curvature. In the case of scales with the form of a complete circle or of a square, the basic material of strips 12 and 16 or their equivalent can be a sheet consisting of concentric or parallel rings, as shown in FIG. 2a, or squares, as shown in FIG. 2b, which can easily be separated, allowing an adequate choice of the proper ring or square according to the size of the main speedometer for which the attachment is needed. The other rings or squares can be discarded. Mounting procedures remain principally the same.

Such a kit would also include a tube of adhesive material with a spout so formed that it can easily be inserted into the holes 22 of the numbers or letters 18. Also, a conversion chart to show where the numbers 18 should be positioned on the scale can be included.

Being that the speed limit in different countries are determined from completely different points of view, a mere matching of the original numbers 24 of the basic scale 10 may not be adequate. Therefore the kit could include all of the numbers, letters, etc. that normally appear on speedometer scales; e.g., kilometer scale attachments for American vehicles operated in Europe or Latin America or Mexico, American military vehicles operated in Japan and the Far East, British vehicles operated in continental Europe and continental vehicles operated in Britain, etc.

Although the invention has been described in considerable detail with respect to a preferred embodiments thereof, it will be apparent that the invention is capable of numerous modifications and variations apparent to those skilled in the art without departing from the spirit and scope of the invention.

I claim:

1. A kit for permitting the direct reading in a first unit length per unit time from a basic speedometer scale including an indicator and dial reading in a second unit length per unit time at least one of said second unit length and said second unit time being different from a corresponding one of said first unit length and said first unit time, said kit comprising an elongate member attachable to a basic speedometer scale, said elongate member having portions forming at least one elongate guideway for receiving indicia members moveable longitudinally of said elongate member, indicia members including a portion engageable in said elongate guideway to adjustably secure said indicia members on said elongate member, said indicia members being adjustably moveable along said elongate guideway, means for securing said elongate member to said basic speedometer scale such that said elongate member is superposed over the dial of said basic speedometer scale, and means for fixing the position of said indicia members in said guideway whereby, when said elongate member is attached to said basic speedometer scale, said indicia members can be fixed in position to read in said first unit of length per first unit of time where said scale reads in said second units of length per said second units of time.

2. A kit according to claim 1 wherein said elongate member comprises a first elongate strip member and a second elongate strip member, said second strip member being narrower than said first strip member and laminated thereto such that said first strip member overlaps both sides of said second strip member, the overlapping edges of said first strip member constituting said elongate guideways.

3. A kit according to claim 2 wherein each of said indicia members includes upper and lower portions engageable with said overlapped edges of said first strip member.

4. A kit according to claim 1 wherein said securing means comprises at least one adhesive strip provided on an elongate surface of said elongate member.

5. A kit according to claim 1 wherein each indicia member has a front face and a rear face and, wherein said position fixing means comprises at least one aperture extending from its front face to its rear face.

6. A kit according to claim 1 including a plurality of said elongate members of varying length.

7. A kit according to claim 1 wherein said elongate member comprises a circular strip.

8. A kit according to claim 1 wherein said elongate member comprises a square strip.

9. A kit according to claim 7 wherein said kit includes a plurality of said circular strips.

10. A kit according to claim 8 wherein said kit includes a plurality of said square strips.

* * * * *